United States Patent
Kabatzke

(10) Patent No.: US 7,650,786 B2
(45) Date of Patent: Jan. 26, 2010

(54) APPARATUS FOR MONITORING THE ROTATIONAL SPEED IN A WIND ENERGY PLANT

(75) Inventor: Wolfgang Kabatzke, Geesthacht (DE)

(73) Assignee: Nordex Energy GmbH, Norderstedt (DE)

( * ) Notice: Subject to any disclaimer, the term of this patent is extended or adjusted under 35 U.S.C. 154(b) by 0 days.

(21) Appl. No.: 12/050,194

(22) Filed: Mar. 18, 2008

(65) Prior Publication Data
US 2009/0193894 A1    Aug. 6, 2009

(30) Foreign Application Priority Data
Feb. 5, 2008    (DE) .................... 10 2008 007 519

(51) Int. Cl.
*G01P 3/04* (2006.01)
(52) U.S. Cl. .......................... 73/510; 73/1.28
(58) Field of Classification Search ............ 73/510, 73/1.25, 1.26, 1.27, 1.28, 1.29, 1.34, 1.35, 73/196
See application file for complete search history.

(56) References Cited

U.S. PATENT DOCUMENTS

| | | | | |
|---|---|---|---|---|
| 2,265,787 A * | 12/1941 | White | ...................... | 73/113.01 |
| 2,844,960 A * | 7/1958 | Staros | .......................... | 73/181 |
| 4,112,311 A * | 9/1978 | Theyse | ......................... | 290/44 |
| 4,331,881 A * | 5/1982 | Soderholm et al. | ............ | 290/44 |
| 4,829,441 A * | 5/1989 | Mandle et al. | ................. | 702/96 |
| 5,237,975 A * | 8/1993 | Betki et al. | .................. | 123/497 |
| 6,205,376 B1 * | 3/2001 | Gordon | ......................... | 701/4 |
| 6,749,393 B2 * | 6/2004 | Sosonkina | .................... | 415/4.1 |
| 7,086,834 B2 * | 8/2006 | LeMieux | ........................ | 416/1 |
| 7,249,486 B2 * | 7/2007 | Wobben | ..................... | 73/1.29 |
| 7,487,673 B2 * | 2/2009 | Ormel et al. | ............. | 73/170.07 |
| 2003/0035725 A1 * | 2/2003 | Sosonkina | .................... | 416/11 |
| 2005/0276696 A1 * | 12/2005 | LeMieux | ..................... | 416/61 |
| 2008/0116690 A1 * | 5/2008 | Kabatzke et al. | ............. | 290/44 |
| 2009/0212565 A1 * | 8/2009 | Kabatzke et al. | ............. | 290/44 |

* cited by examiner

*Primary Examiner*—Hezron Williams
*Assistant Examiner*—Samir M Shah
(74) *Attorney, Agent, or Firm*—Vidas, Arrett & Steinkraus, P.A.

(57) ABSTRACT

An apparatus for monitoring the rotational speed in a wind energy plant, with a rotor shaft which is driven by the rotor and runs out into a gear unit, and with a generator shaft, which connects an output shaft of the gear unit with a generator/converter unit, characterized by a first rotational speed detection unit on the rotor shaft and a second rotational speed detection unit on the generator shaft, wherein each rotational speed detection unit has at least two rotational speed sensors working independently from each other, an analyzing unit for the rotational speed, to which the measured signals of the rotational speed detection units are applied and which generates an error signal for a rotational overspeed when a certain maximum value for the rotational speed is exceeded.

10 Claims, 1 Drawing Sheet

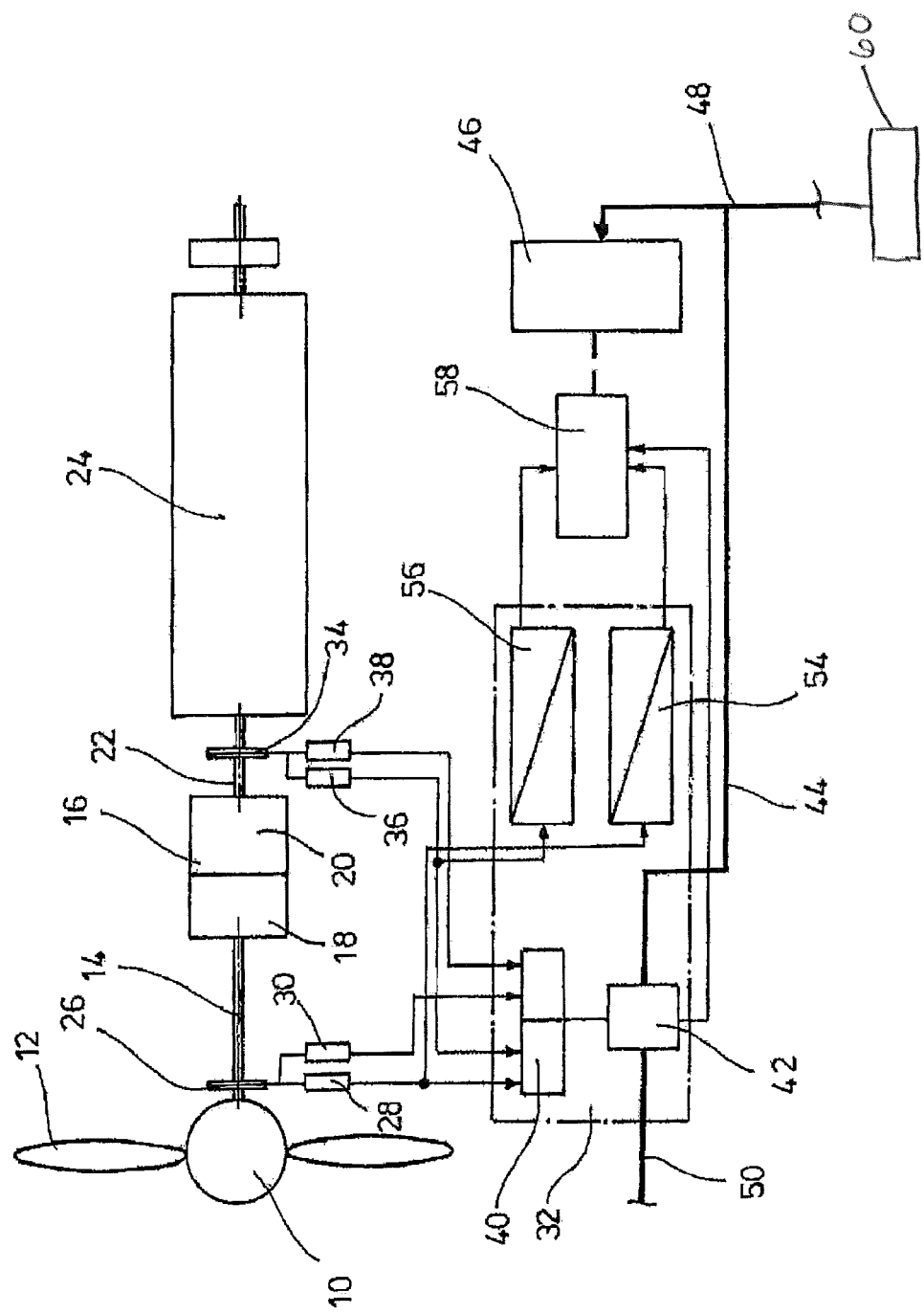

APPARATUS FOR MONITORING THE ROTATIONAL SPEED IN A WIND ENERGY PLANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to an apparatus for monitoring the rotational speed in a wind energy plant. Such an apparatus is sometimes also called a rotational speed monitor.

The drive train of a wind energy plant begins with a rotor which carries the rotor blades. The rotor is connected to a rotor shaft, which is coupled to a gearbox. The rotor shaft is sometimes also called a slow shaft. The output shaft of the gearbox runs out into the generator as the generator shaft and is also called the rapid shaft. In known wind energy plants, a toothed disk is arranged on the rotor shaft, which generates pulses via inductive pulse transmitters, the frequency of which is proportional to the rotational speed of the rotor shaft. The pulses are analysed by an electronic module. Also, the sampled pulses are converted into a current signal via a frequency/current converter (f-I converter) and reach a central control unit of the wind energy plant. In the central control unit of the wind energy plant, a critical cut-off rotational speed is filed. When the rotational speed values of the rotor shaft are above the filed cut-off rotational speed, controlled setback of the wind energy plant takes place.

It has proven to be a drawback of the apparatus for monitoring the rotational speed that the rotational speed monitoring does not have sufficient functional security, in particular, it does not comply with a safety integrity level which is required for security directed implementations according to IEC 61508.

The present invention is based on the objective to provide an apparatus for monitoring the rotational speed which provides sufficient functional security for the implementation in a wind energy plant with means which are as simple as possible.

BRIEF SUMMARY OF THE INVENTION

The apparatus of the present invention serves for monitoring the rotational speed in a wind energy plant. The wind energy plant has a rotor shaft driven by a rotor, which runs out in a gearbox. Further, the wind energy plant has a generator shaft, which connects the output shaft of the gear unit with a generator/converter unit. The apparatus of the present invention is characterised by a first rotational speed detection unit on the rotor shaft and a second rotational speed detection unit on the generator shaft. Each one of the two rotational speed detection units has at least two rotational speed sensors working independently from each other. In addition, an analyzing unit for the rotational speed is provided, to which the measured signals of the rotational speed detection units are applied and which generates an error signal for a rotational overspeed when a certain maximum value for the rotational speed is exceeded. The apparatus for monitoring the rotational speed of the present invention has a series of advantages. At first, the rotational speed is acquired on the rotor shaft as well as on the generator shaft, so that a more accurate and reliable analysis of the measurement results can take place in an analysis of the measured rotational speed values. In this, it is to be understood that the change of the rotational speed by the gear ratio in the gear unit is taken into account, so that certain maximum values of the rotational speed are related to either a rotational speed of the rotor shaft or to a rotational speed of the generator shaft.

In the preferred embodiment, the apparatus of the present invention can not only recognise a rotational overspeed in the wind energy plant, but in addition even shaft defects, like shaft fracture or certain gearing defects for instance. In the preferred embodiment, the analyzing unit for the rotational speed compares the measured values of the first rotational speed detection unit with the measured values of the second rotational speed detection unit, taking into account a gear ratio. When there is a deviation of the rotational speed values for at least a predetermined threshold value, an error signal for a shaft defect is generated. The error signal for the shaft defect indicates that the measured rotational speeds of rotor shaft and generator shaft are not in the ratio set by the gearbox.

In a preferred embodiment, the analyzing unit is connected to a security chain for a central control of the wind energy plant. The security chain of a wind energy plant designates a connection to the operation management of the wind energy plant, which leads directly to the electric control unit and to the operation management of the wind energy plant without further signal processing, and which can forward security relevant control signals to the operation management. The security chain is connected to an operating equipment switching unit, which causes a cut-off of the relevant operating equipments when it is triggered by the security chain, and announces the cut-off to the operation management. The great reliability of the analyzing unit for the rotational speed provided according to the present invention permits to connect the same directly with the security chain, without a further signal processing being connected there between.

In a preferred embodiment, it is provided that for predetermined operation conditions, the analyzing unit does not generate an error signal related to a rotational overspeed and/or a shaft defect. Even though it is provided for the predetermined operation conditions that no errors signals are generated, an analysis of the measured rotational speed values can take place anyway, in order to use the same for a control on the wind energy plant, for instance.

In a preferred embodiment, each rotational speed detection unit is equipped with at least two rotational speed sensors. Preferably, each rotational speed sensor has a transducer disk mounted on the shaft, the rotation of which is acquired optically, mechanically, electrically or magnetically. In the preferred embodiment, the acquisition of the rotational speed takes place at least twofold on the rotor shaft and also on the generator shaft. In this way it is made sure that upon failure of one rotational speed sensor, the rotational speed at the rotor shaft and at the generator shaft can be reliably acquired further.

In a preferred embodiment, the transducer disk is realised as a toothed disk, which is coated with a high performance anticorrosion agent for protection against environmental influences at least in the region of its teeth. Conventional toothed disks have often the problem that the structure of the teeth is corroded by environmental influences, like weather-induced humidity, and thus deviations in the contour of the toothed disk occur. Then, such deviations lead to systematic measurement errors in the acquisition of the rotational speeds.

Due to the great accuracy of the acquired rotational speed, it may be provided in addition that the analyzing unit for the rotational speed forwards an actual real value for the rotational speed of the generator shaft and/or of the rotor shaft to a control for the generator and/or for a current converter. Thus, the apparatus for monitoring the rotational speed of the present invention permits in addition to use even the measured rotational speeds for the operation management of the wind energy plant, and with this for the control of the generator/converter unit.

BRIEF DESCRIPTION OF THE VIEW OF THE DRAWING

The apparatus of the present invention will be explained in more detail by one example in the following.

FIG. 1. shows a rotor 10 with two rotor blades 12 in a schematic view. The rotor is coupled with a gearbox/clutch unit 16 via a rotor shaft 14. The gearbox/clutch unit 16 has a gearbox and it may feature a clutch as well as other assembly parts. In the gearbox, there is a conversion of the rotational speed, the rotational speed being speeded up in this. The output shaft of the gearbox 20 is connected to the generator 24 via the generator shaft 22. Generator 24 and a converter for converting the generated current in common constitute the generator/converter unit.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated On the rotor shaft 14, a rotational speed detection unit 26 is provided. The rotational speed detection unit 26 consists of two toothed disks arranged independently on the rotor shaft 14 (not shown), which have a toothing that points radially towards the outside. In the region of the toothing, the toothed disks are provided with a protective coating, which protects the teeth against environmental influences. The two signals of the toothed disks (not shown) are applied to an analyzing unit via separated channels 28, 30. In order to form a sufficient functional security for the sensor signals of the rotor shaft, the toothed disks are monitored separately from each other, the rotational speed sensors each having an own power supply and an own line. Even electronic processing and amplification of the signals take place independently from each other, so that there is still sufficient security upon malfunction of one component.

In a corresponding way, the rotational speed detection unit 34 on the generator shaft 22 is also shown in the single FIGURE. The rotational speed detection unit 32 has also two toothed disks provided independently from each other (not shown), the rotation of which is read out by two sensors which are independent from each other. The corresponding sensors are supplied with current independently from each other and are each one individually connected to the central analyzing unit 32 via the channels 36 and 38.

The analyzing unit 32 has an error recognition module 40, to which the output signals of the rotational speed sensors are applied. The module checks out with the applied four signals which rotational speed is present. When the rotational overspeed is defined with respect to the generator shaft 22, the two applied signals 28 and 30 from the rotor shaft are converted, taking into account the gear ratio of the gearbox 20. Thereafter, it is checked whether one of the measured values exceeds the preset maximum rotational speed. When the maximum rotational speed is exceeded, an error signal is applied to an error module 42 of the analyzing unit 32. The error signal causes that the operating equipment switching unit 60 deactivates all the operating equipments which are critical for the plant condition via a direct connection 44, and parallel to this, a concerted setback of the wind energy plant into a safe operating condition takes place with active support through the central control 46. The direct connection 44 with the operating equipment switching unit 60 is called a security chain. The central control 46 can not exert any influence on the security chain, because it analyses the condition of the direct connection 44 only in a reading manner. As can be recognised in the FIGURE, the security chain may also be directly connected with other security relevant units. The further security relevant units may also be directly applied to the central control 46 and the operating equipment switching unit 60, by-passing the analyzing unit 32, as indicated by the line 48 for instance, or they may be applied to the analyzing unit 32 with the connector 50 and be guided to pass through the error module 42.

In addition to recognising a rotational overspeed, the error recognition module 40 may also compare the ratio of the rotational speed at the rotor shaft with the rotational speed at the generator shaft. When the ratio of the rotational speeds deviates for more than a predetermined threshold value from the preset gear ratio of the gearbox, the error recognition module 40 generates also an error signal, which is forwarded to the central control 46 via the error module 42. The threshold value for the recognition of an error in the drive train may be 10% of the gear ratio, for instance. Besides to gearbox errors, which can be recognised by a wrong gear ratio between the rotational speeds, the error recognition module 40 can also recognise an error in the drive train, from which a fracture of the shaft or a breakaway of a shaft connection can be deduced. Upon such an error, there is no value for the rotational speed of the generator shaft.

Even in this case, an error signal is forwarded into the operating equipment switching unit 60 and into the central control 46 (only reading and analyzing) by the error module 42, which causes a setback of the wind energy plant into a safe condition. In addition to the error recognition module 40 for analyzing the signals and to the error module 42 for delivering the error announcement for the operating equipment switching unit 60 and the central control 46, the analyzing unit 32 has also two frequency/current converters (f-I converters).

The frequency/current converters 54, 56 convert the applied frequency signals of the rotational speed sensors into analog current signals. In the shown example, only the frequency signals of one sensor from the rotor shaft or one from the generator shaft are applied to the f-I converter at a time. In principle, it is also possible that both rotational speed sensor signals are applied to the f-I converter. It is also conceivable that it may be switched over between the rotational speed sensors purposefully (not shown).

The currents signals of the f-I converters 54, 56 are applied to a conversion calculation module 58, which converts the corresponding current values into a rotational speed of the generator shaft 22 and applies it to the central control 46 of the wind energy plant.

In the operation of the wind energy plant, the control of the generator and/or of the converter takes place by the central control 46 for the operation management at active operating equipment switching unit 60, which permits the operation of the wind energy plant. In this, the values relating to the rotational speed of the generator shaft 22 necessary for the control are provided by the conversion module 58.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. An apparatus for monitoring the rotational speed in a wind energy plant, with a rotor shaft (14) which is driven by a rotor and runs out into a gear unit (16), and with a generator shaft (22), which connects an output shaft of the gear unit (16) with a generator/converter unit (24), characterized by a first rotational speed detection unit (26) on the rotor shaft (14) and a second rotational speed detection unit (34) on the generator shaft (22), wherein each rotational speed detection unit (26, 34) has at least two rotational speed sensors working independently from each other, an analyzing unit (32) for the rotational speed, to which measured signals (28, 30, 36, 38) of the rotational speed detection units (26, 34) are applied and which generates an error signal for a rotational overspeed when a certain maximum value for the rotational speed is exceeded, and further characterized in that the analyzing unit (32) for the rotational speed compares the measured values (28,30) of the first rotational speed detection unit (26) with the measured signals (36,38) of the second rotational speed detection unit (34), taking into account a gear ratio, and generates an error signal for a shaft defect at a deviation of the rotational speed values for at least a predetermined threshold value.

2. An apparatus according to claim 1, characterised in that the analyzing unit is connected to a security chain (44) of a central control (46) or to an operating equipment switching unit (60) of the wind energy plant.

3. An apparatus according to claim 1, characterised in that for predetermined operation conditions, the analyzing unit (32) does not generate an error signal related to a rotational overspeed or a shaft defect.

4. An apparatus according to claim 1, characterised in that each rotational speed detection unit (26, 34) has at least two transducer disks.

5. An apparatus according to claim 4, characterised in that each rotational speed sensor has a transducer disk mounted on its respective shaft, the rotation of which is acquired optically, mechanically, electrically or magnetically.

6. An apparatus according to claim 1, characterized in that the analyzing unit (32) for the rotational speed forwards a real value for the rotational speed of the generator shaft (14) to a control for the generator or for its converter.

7. An apparatus according to claim 1, characterized in that the analyzing unit is connected to a security chain (44) of a central control (46) and to an operating equipment switching unit (60) of the wind energy plant.

8. An apparatus according to claim 1, characterized in that for predetermined operation conditions, the analyzing unit (32) does not generate an error signal related to a rotational overspeed and a shaft defect.

9. An apparatus according to claim 1, characterized in that the analyzing unit (32) for the rotational speed forwards a real value for the rotational speed of the generator shaft (14) to a control for the generator and for its converter.

10. An apparatus for monitoring the rotational speed in a wind energy plant, with a rotor shaft (14) which is driven by a rotor and runs out into a gear unit (16), and with a generator shaft (22), which connects an output shaft of the gear unit (16) with a generator/converter unit (24), characterized by a first rotational speed detection unit (26) on the rotor shaft (14) and a second rotational speed detection unit (34) on the generator shaft (22), wherein each rotational speed detection unit (26, 34) has at least two rotational speed sensors working independently from each other, an analyzing unit (32) for the rotational speed, to which measured signals (28, 30, 36, 38) of the rotational speed detection units (26, 34) are applied and which generates an error signal for a rotational overspeed when a certain maximum value for the rotational speed is exceeded and further characterized in that a toothed disk is provided as a transducer disk, which is coated with an anti-corrosion agent at least in the region of its teeth.

* * * * *